United States Patent [19]

Bodnar et al.

[11] Patent Number: 4,902,773
[45] Date of Patent: Feb. 20, 1990

[54] METHOD OF PREPARATION OF UNSATURATED POLYESTER RESINS FROM MALEIC ACID/ANHYDRIDE

[75] Inventors: Akos Bodnar, Balatonfured; Maria Solymoss, Veszprem; Ibolya Vancson Szmercsanyi, Budapest; Istvan Szigeti, Veszprem; Laszlo Szommer, Fuzfögyartelep, all of Hungary

[73] Assignee: Nitrokemia Ipartelepek, Füzfögyártelep, Hungary

[21] Appl. No.: 128,903

[22] Filed: Dec. 4, 1987

[30] Foreign Application Priority Data

Dec. 3, 1986 [HU] Hungary .............................. 5001/86

[51] Int. Cl.⁴ ....................... C08G 63/52; C08G 63/54
[52] U.S. Cl. .................................... 528/303; 528/304; 528/38; 528/39; 528/40
[58] Field of Search ................... 528/303, 304; 525/38, 525/39, 40

[56] References Cited

U.S. PATENT DOCUMENTS

| | | | |
|---|---|---|---|
| 2,877,203 | 3/1959 | Forsythe et al. | 528/303 |
| 3,150,208 | 9/1964 | Carson et al. | 528/303 |
| 3,222,421 | 12/1965 | Lundberg | 525/37 |
| 3,238,274 | 3/1966 | Allan | 525/37 |
| 3,355,408 | 11/1967 | Mayer et al. | 528/303 |
| 3,546,176 | 12/1970 | Umfreville et al. | 528/303 |
| 3,592,874 | 7/1971 | Reese et al. | 525/37 |
| 3,838,106 | 9/1974 | Shaki et al. | 528/303 |
| 3,923,927 | 12/1975 | Miyake et al. | 525/38 |
| 4,569,986 | 2/1986 | Oshima et al. | 528/303 |
| 4,663,393 | 5/1987 | Arlaud et al. | 528/304 |
| 4,684,695 | 8/1987 | Oshima et al. | 528/304 |

FOREIGN PATENT DOCUMENTS

| | | | |
|---|---|---|---|
| 711304 | 6/1965 | Canada . | |
| 119913 | 7/1982 | Japan | 525/37 |

Primary Examiner—Harold D. Anderson
Assistant Examiner—Dennis R. Daley
Attorney, Agent, or Firm—Birch, Stewart, Kolasch & Birch

[57] ABSTRACT

The invention relates to the acceleration of the synthesis of unsaturated polyesters containing maleic acid/anhydride, 1 to 30 percent, preferably 5 to 15 percent of the prescribed maleic acid/anhydride is introduced into the reaction mixture in total or in two or more increments at the stage of the reaction when the acid number or the molecular weight of the mixture has reached about 50 to 250 or about 300 to 1500, respectively. Thus, the rate of polyesterification can be increased considerably, occasionally two-folds and, in addition, polyester resins of very low acid number or high molecular weight can be prepared.

13 Claims, No Drawings

METHOD OF PREPARATION OF UNSATURATED POLYESTER RESINS FROM MALEIC ACID/ANHYDRIDE

BACKGROUND OF THE INVENTION

1. Field of the Invention

The present invention relates to a method of accelerated preparation of unsaturated polyesters based on maleic acid/anhydride.

2. Discussion of Related Art

It is known that the synthesis of unsaturated polyester resins, i.e. a polyesterification, usually occurs in the absence of a catalyst, since the protons from the COOH groups of dicarboxylic acids serve as catalyst (P. H. Selden: Glasfaserverstarkte Kunststoffe, Springer Verlag, Berlin-Heidelberg-New York, 1967, p. 16).

The most widely used acid component of unsaturated polyesters is maleic acid/anhydride, which is used as a strong acid, and in most cases, provides appropriate proton concentrations to the catalysis (I. Vancsó-Szmercsányi, E. Makay-Body: J. Polym. Sci., Pt. C, 16, 3709/1968/). During esterification, however, the concentration of the COOH groups decreases, and consequently, the reaction proceeds at a decreasing rate due to the exhausting of the amount of catalytic protons (P. J. Flory: J. Amer. Chem. Soc., 61, 3334/1939/).

It has now been discovered experimentally that the rate of polyesterification can markedly be increased by the addition of a small porton of maleic acid/anhydride to the reaction mixture during an advanced stage of the reaction.

It has been found that the rate of reaction may be increased more than twofolds, i.e. the manufacturing cycle can be reduced to about one half. In addition, the proceeding of the reaction is practically linear in time and without any slow-up. The significance of these observations is implied in relation with the experimetal experience which was provided by the method of the present invention permits a simple procedure for the preparation of high-molecular-weight unsaturated polyesters.

The reduction in the reaction period involves favorable consequences to quality improvement. E.g. it is known that synthesis of maleic acid-based polyesters are accompanied by undesirable side-reactions. The most considerable one is a partial addition of alcoholic OH groups to some of the unsaturated bonds (Z. Ordelt: Makromol. Chem., 63, 153/1963/). As a consequence, unsaturation of polyester chains may decrease even by as much as 10 percent, leading to a reduction in crosslink density of the copolymerization-cured resin. Another deleterious effect of the said side-reaction is a chain branching. In the procedure provided by the present invention, the unfavorable side-reaction is suppressed.

Industrial unsaturated polyesters are mixed esters synthesized from several types of carboxylic acids and alcohols. The most current unsaturated component is maleic acid/anhydride which is accompanied by saturated dicarboxylic acids, such as phthalic, sebacic, succinic acids, etc. In a single-step esterification procedure, these components are reacted simultaneously.

Summary of the Invention

According to the present invention, polyesterification is initiated with the introduction of maleic acid/anhydride into the reaction vessel in an amount less than the amount desired in the prescription by 1 to 30 percent, preferably by 5 to 15 percent. Polycondensation with the other components, such as the dicarboxylic acid(s), optionally the monocarboxylic acid(s), and diols, are carried out in a molten state or in solution (azeotropic condensation), in the presence of an inhibitor, at 150° to 190° C., with continuous temperature rise. An inert gas stream is introduced to the stirred molten reaction mixture. Developing water is continuously removed. In the azeotropic condensation, solvents (xylene, toluene) are recycled into the reaction mixture. As the acid number of the reaction mixture has reached about 50 to about 250, preferably 100 to 150, an additional portion of maleic acid/anhydride is introduced and condensation is continued until the desired molecular weight has been achieved. In another procedure according to the present invention, the additional maleic acid/anhydride is added to the reaction mixture in two or more increments. The first increment is introduced at an acid number between 150 and 250, then the second increment is introduced when the acid number is about 50 to 100. Polyesterification is conducted either at atmospheric or reduced pressure (about 0.1 to 0.8 bar). As the desired molecular weight (acid number) has been reached the condensation is terminated and the polyester is dissolved in a conventional manner in vinyl and/or allyl comonomer(s).

Thus, the present invention relates to a method for the preparation of unsaturated polyesters by polycondensation of maleic acid/anhydride, with some saturated dicarboxylic acids and optionally with monocarboxylic acid(s) and with an equivalent or nearly equivalent amount of diols which is characterized by reserving 1 to 30 percent, preferably 5 to 15 percent of the prescribed amount of maleic acid/anhydride at the beginning of the reaction, and subsequently adding it in total or in two or more increments to the reaction mixture during the polyesterification at the stage when the acid number of the molecular weight of the polyester has reached about 50 to about 250 or about 300 to about 1500, respectively. After the subsequently added portion(s) of maleic acid/anhydride, acting as a catalyst, has been completely introduced, the polyesterification is continued until the desired molecular weight is obtained.

The following examples are presented to illustrate the invention:

EXAMPLE 1

88 g of maleic anhydride, 148 g of phthalic anhydride, and 160 g of propanediol-1,2 were condensed in a three-necked sulfurizing flask under nitrogen introduction with continuous stirring and removal of the developing water at 160° to 180° C., and gradually rising the temperature. As the acid number of the reaction mixture had reached about 145 to 150, 10 g of maleic anhydride was added and polycondensation was continued at 190° C. Heating was stopped at an acid number of 50, then 1 g of hydroquinone was added to the polyester. Finally, the polyester was dissolved in a styrene monomer using 60 parts of polyester to 40 parts of styrene by weight. The solution could be used (cured) in the usual ways.

Note: Duration of condensation by the procedure of Example 1 is 7 hours. By a single-step addition of the total amount of maleic anhydride, the corresponding time is about 15 hours.

EXAMPLE 2

176 g of maleic anhydride, 148 g of phthalic anhydride, 118 g of succinic acid, and 430 g of diethyleneglycol were reacted in the same manner as in Example 1. At an acid number of about 120 to 130, 20 g of maleic anhydride was added to the reaction mixture and polyesterification was continued at 195° C. up to an acid number of about 20. Upon completion of the condensation, 2 g of hydroquinone were added to the polyester and then the resin was dissolved in a 1:1 mixture of styrene and methyl methacrylate wherein the weight ratio of the polyester to the comonomers is 65:35.

EXAMPLE 3

176 g of maleic anhydride, 148 g of phthalic anhydride, 118 g of succinic acid, and 430 g of diethylene glycol were reacted in the same manner as in Example 1. At an acid number of about 145 to 150, 10 g of maleic anhydride was added to the reaction mixture and then the esterification was continued at 190° C. As the acid number of the reaction mixture had decreased to about 95 to 100, another 10 g of maleic anhydride was added. Afterwards, the procedure of Example 2 was followed.

EXAMPLE 4

88 g of maleic anhydride, 148 g of phthalic anhydride, 63 g of ethyleneglycol, and 78 g of propanediol-1,2 were condensed in the presence of 20 g of xylene at 150° to 175° C. The xylene was separated from water by distillation and then recycled into the reaction zone. At an acid number of about 145 to 150, 10 g of maleic anhydride was added to the reaction mixture and polyesterification was continued at 190° C. up to an acid number of about 50. At this point, the recycling of the xylene was stopped and completely evaporated and removed at reduced pressure (between 0.1 and 0.3 bar) for 1 hour. Afterwards, the procedure of Example 1 was followed.

EXAMPLE 5

88 g of maleic anhydride, 130 g of phthalic anhydride, 31 g of palmitic acid, and 160 g of propanediol-1,2 were reacted. The procedure of Example 1 was followed in all respects.

What is claimed is:

1. A polycondensation method for preparing an unsaturated polyester comprising:
    polycondensing in a reaction system maleic acid/anhydride and a saturated dicarboxylic acid with an equivalent amount or 1 to 5 mole percent of a stoichiometric excess of a diol,
    said polycondensation method characterized in that additional maleic acid/anhydride in an amount of 1 to 30 percent, based on the amount of maleic acid/anhydride prescribed prior to the polycondensing step, is added to said reaction system at the stage of polycondensation when the acid number is 50 to 250 or the molecular weight of the polycondensed product formed is 300 to 1500, said additional amount of the maleic acid/anhydride is added in total or in two or more increments.

2. The method according to claim 1, in which said maleic acid/anhydride, said saturated dicarboxylic acid and a monocarboxylic acid with said diol is polycondensed in said reaction system.

3. The method according to claim 1, wherein the amount of additional maleic acid/anhydride added is 5 to 15 percent.

4. The method according to claim 1, wherein said additional amount is added at the stage of polycondensation when the acid number is 50 to 250.

5. The method according to claim 4, wherein said additional amount is added in total.

6. The method according to claim 4, wherein said additional amount is added in two or more increments.

7. The method according to claim 6, wherein said additional amount is added in two increments in which the first increment is added when the acid number is 150 to 250 and the second increment is added when the acid number is 50 to 100.

8. The method according to claim 1, wherein said additional amount is added at the stage of polycondensation when the molecular weight of the polycondensed product formed is 300 to 1500.

9. The method according to claim 8, wherein said additional amount is added in total.

10. The method according to claim 8, wherein said additional amount is added in two or more increments.

11. A method for preparing a curable composition which comprises:
    preparing an unsaturated polyester by a polycondensation method comprising:
    polycondensing in a reaction system maleic acid/anhydride and a saturated dicarboxylic acid with an equivalent amount or 1 to 5 mole percent of a stoichiometric excess of a diol,
    said polycondensation method characterized in that additional maleic acid/anhydride in an amount of 1 to 30 percent, based on the amount of maleic acid/anhydride prescribed prior to the polycondensing step, is added to said reaction system at the stage of polycondensation when the acid number is 50 to 250 or the molecular weight of the polycondensed product formed is 300 to 1500, said additional amount of the maleic acid/anhydride is added in total or in two or more increments, and
    dissolving the prepared unsaturated polyester in a monomer composition comprising a vinyl monomer, an allyl monomer or a mixture thereof.

12. The process according to claim 11, wherein the monomer composition comprises styrene.

13. The process according to claim 11 wherein the monomer composition comprises a mixture of styrene and methyl methacrylate.

* * * * *